INVENTOR
Jerry D. Merryman
BY Thomas G. Harwood
ATTORNEY

Oct. 20, 1970 J. D. MERRYMAN 3,535,532

INTEGRATED CIRCUIT INCLUDING LIGHT SOURCE, PHOTODIODE AND ASSOCIATED COMPONENTS

Original Filed June 29, 1964 4 Sheets-Sheet 2

INVENTOR

Jerry D. Merryman

BY Thomas A. Harwood

ATTORNEY

INVENTOR
Jerry D. Merryman
BY Thomas G. Harwood
ATTORNEY

INVENTOR

Jerry D. Merryman

BY Thomas A. Harwood

ATTORNEY

United States Patent Office 3,535,532
Patented Oct. 20, 1970

3,535,532

INTEGRATED CIRCUIT INCLUDING LIGHT SOURCE, PHOTODIODE AND ASSOCIATED COMPONENTS

Jerry D. Merryman, Dallas, Tex., assignor to Texas Instruments Incorporated, Dallas, Tex., a corporation of Delaware Continuation of application Ser. No. 379,755, June 29, 1964. This application Apr. 21, 1969, Ser. No. 820,037
Int. Cl. H01l 15/06
U.S. Cl. 250—217 35 Claims

ABSTRACT OF THE DISCLOSURE

In the disclosed optoelectronic system a solid-state light source generates optical radiation which impinges upon a photosensitive detector formed in a semiconductor substrate in which the substrates function as one of the active regions of the diode. A plurality of interconnected components may be formed within the body of semiconductor material so as to cooperate with the photosensitive detector to form a complete electrical circuit within the body of semiconductor material.

This application is a continuation of copending application Ser. No. 379,755, filed June 29, 1964, and now abandoned.

This invention relates generally to optoelectronic circuitry, and more particularly to electronic systems utilizing optical coupling of electrical signals between electrical circuits, especially of the integrated semiconductor network type, including the provision of circuits utilizing such coupling.

Optical coupling between two circuits within a network is becoming more widely used as an expedient for providing complete electrical isolation between the two circuits, whereby the output of one circuit contains a solid-state light generating device directed on a photosensitive semiconductor device contained in the input of another circuit to generate an input signal in response to the optical radiation. Such an arrangement gives many advantages over conventional electrical coupling means between various stages of circuitry, since the two circuits optically coupled together can be completely electrically isolated to prevent the coupling from one circuit to the other of undesirable signals, such as caused by circulating ground currents or common mode signals. In this sense, such an arrangement is considered to provide complete common mode rejection of signals. Moreover, the optically coupled circuits are completely independent insofar as the electrical connections are concerned, wherein one circuit may be connected to or be supplied by one reference potential source with the other circuit being connected to or supplied by a different reference potential which is entirely unrelated to the one source. This arrangement has advantages over conventional transformer coupling between circuits which is also used to provide electrical isolation. This results from the fact that both AC and DC signals may be coupled between circuits, since the signal is proportional to the intensity of the optical radiation, whereas only AC signals are coupled by transformers. Moreover, transformers can not be provided in solid state, semiconductor networks for miniature applications as can the optical coupling scheme. Reference to the copending application of Biard et al., entitled Electro-Optical Coupling Device, Ser. No. 327,136, filed Nov. 29, 1963, and assigned to the same assignee, will provide a further description of the uses and advantages of optoelectronic systems.

Because of the solid-state nature of optoelectronics, it has primary utility in its application to integrated, semiconductor networks of miniature size. The compact, integrated nature of solid-state semiconductor networks, however, presents unique problems in designing circuits which will provide equivalent functions of conventional circuits, whereas these problems would otherwise be nonexistent in the wiring of electrical circuits containing discrete electrical components. Such is the case in the provision within a semiconductor network of a solid-state light source optically coupled to a solid-state photosensitive detector or an optoelectronic device, such as the type described in the above mentioned Biard et al., application, wherein it has been found that the optical radiation generated by such a light source, the wavelength of which is normally in the infrared region, penetrates to a relatively large depth in the semiconductor body within which the network is formed. The deep penetration of the light is undesirable if the detector is electrically isolated from the semiconductor network substrate by an additional rectifying junction, which is often the case with many such components comprising the network from a desirable circuit design standpoint. That is to say, if this detector isolation junction collects an appreciable percentage of the charge carriers produced by the light absorption, which carriers would otherwise be collected by the active junction of the detector, then the problem of the efficient utilization of the light by the detector is presented. The invention, in one broad aspect, is directed to solve this problem so that optical coupling between circuits within a semiconductor integrated network can be efficiently utilized.

In addition to the problem above, other areas of considerations are involved in the utilization of optoelectronics in integrated networks. The above-noted Biard et al. application describes the basic combination of a semiconductor light source optically coupled to a semiconductor junction photosensitive detector, whereby in order that there be efficient collection of the light by the detector, the detector junction must be made relatively large in area. This results in a relatively large detector junction capacitance. This presents another problem in the utilization of optoelectronics in instances where fast response times are required, and the present invention is also directed to provide a circuit arrangement used in conjunction with a solid-state light source and detector so that fast response times can be achieved. It should be remarked that this problem arises because of the inherently large capacitance, relatively speaking, of the detector junction and not as a result of the adaptation of the detector to an integrated network. Thus the circuit embodying the solution to this problem, which the invention provides, has application to both conventional and integrated network electronics. A further problem is encountered, however, in the adaptation of some circuits to integrated networks which require resistors of very large magnitudes, wherein integrated network resistors are limited in that the magnitudes thereof can not exceed a predetermined maximum value. The physical size or length of a resistor within a network is detemined, to a large extent, by the magnitude thereof, and consequently, the above limitation controls. Therefore, the invention is directed, in another aspect thereof, to provide a fast response time circuit utilizing optoelectronics which is adapted to integrated networks that takes into account realistic network resistor values.

All of the above relates to the more general considerations in the utilization of optoelectronics, and especially its application to integrated semiconductor networks. Actually, the combination of a light source and detector of the type under consideration is a switch where an electrical signal in one circuit actuates the light source to cause the generation of optical radiation having a magnitude proportional to the signal, and the transfer of the signal by means of the optical radiation to the detector connected in another circuit. The detector produces an electrical output signal which is responded to by the circuit containing the detector. Normally, this circuit will contain an active device, such as a transistor, for example, to act on and respond to the detector output. In this sense, this circuit is an amplifier in its broadest meaning. This leads to the consideration of providing an amplifier within an integrated network utilizing optoelectronics, whereby the amplifier is characterized by a very fast response time, which is equivalent to having a very wide bandwidth. This invention provides such an amplifier in another embodiment, and because of the optical coupling feature, the amplifier responds to signals over the range from DC signals to very high frequency signals.

In accordance with the invention, there is provided the adaptation to an integrated network of optoelectronics to efficiently utilize the optical radiation generated by a solid-state light source, wherein, in a preferred embodiment, the photosensitive diode is formed within the semiconductor substrate of the network by the single diffusion of an impurity so that the substrate acts as one of the active regions, such as the anode, for example, of the photosensitive diode. Thus there is no isolation junction isolating the detector from the substrate which would otherwise reduce the optical efficiency of the detector. This is the preferred construction underlying all of the circuits provided which are adapted to integrated networks. A very fast response time circuit is provided which utilizes a negative feedback amplifier so that the photosensitive diode appears to be operating into a low impedance to give the fast response time. Preferably, this amplifier takes on the form of a Darlington configuration to reduce input capacitance which would slow-down the circuit. Because of the negative feedback used, larger resistors than are practical in integrated networks are not required. A fast response time, high gain amplifier is provided by utilizing more amplification stage with the basic negative feedback configuration to provide a simple, single-ended (only one power supply required) DC amplifier. In the provision of the basic feedback circuit used in conjunction with the photosensitive diode and its adaptation to integrated networks, a capacitive coupling between the output and input is used as a means for negative feedback, which is operational only at high frequencies, to eliminate or considerably reduce the distributive capacitance effect associated with the feedback resistor, wherein such distributive capacitances associated with resistors is unique in the resistor construction of integrated networks and would cause undesirably high frequency oscillations or instability. Moreover, another novel circuit arrangement is provided in the preferred amplifier embodiment of the invention, which comprises the combination of a pair of transistors utilized in such a way between the output of the negative feedback portion of the amplifier and the following amplifier stages, so that the transistor which amplifies the output of the negative feedback stage cannot saturate, which would otherwise lengthen the cut-off time of the overall amplifier. The novel operation of the pair of transistors, which provides a voltage clamping effect through an emitter follower and an amplification effect, also maintains the negative feedback circuit operational under the proper conditions, which would otherwise be detrimentally affected should the output of the negative feedback circuit be affected by a heavy current drain caused by the following amplifier stages. The transistors of the amplifier provided by the invention are also matched to give excellent thermal stability. Finally, the application of the basic feedback system is described in its use with other circuits such as differential amplifiers.

Other objects, features and advantages will become apparent from the following detailed description of the invention when taken in conjunction with the appended claims and attached drawing wherein like reference numerals refer to like parts throughout the several figures, and in which:

Figure 1:
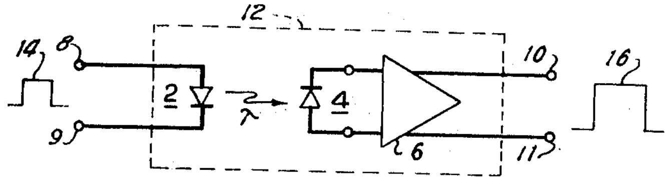
FIG. 1 is a schematic diagram of the general application of optoelectronic circuitry.

In order to more clearly define the objects of the invention, reference will be had to FIGS. 1 through 6, and a brief discussion of the general subject matter to which the invention relates. Referring specifically to FIG. 1, the dashed enclosure 12 represents, schematically, a box which has a pair of input terminals 8 and 9 and a pair of output terminals 10 and 11, whereby the output terminals are completely electrically isolated from the input terminals. The box 12 can be a semiconductor integrated network, for example, and contains a semiconductor diode light source 2 such as described in the above noted Biard et al., for example. This light source preferably comprises a junction diode which generates optical radiation in response to a current flow in the forward direction through its junction, wherein the current is produced by a voltage pulse 14 applied to the input terminals. The diode light source is comprised of a suitable semiconductor material, such as, for example, gallium-arsenide or some other semiconductor composition set forth in the Biard et al. application. For gallium-arsenide, the wavelength of the optical radiation is in the infrared region and is about 0.9 micron. Optically coupled to the light source is a photosensitive diode 4, or other photosensitive semiconductor junction device, which is connected to a load circuit 6, such as an amplifier, for example, with the output of the amplifier being connected to output terminals 10 and 11. The circuit 6 can be of a character to provide any desired function and is controlled at its input by the photocurrent produced by the photosensitive diode 4 in response to the optical radiation. The current generated by the diode 4 is, in turn, controlled by the intensity of the optical radiation directed thereon by the light source 2, wherein the light source and the photosensitive diode are completely electrically isolated, thus isolating the input and output terminals of the box or network. Consequently, a voltage pulse 14 applied to the input terminals 8 and 9 causes the generation of an output 16 of the desired configuration, depending upon the nature of the circuit 6. The optoelectronic system depicted in FIG. 1 has many advantages, wherein one advantage permits complete electrical independence between the input and output terminals so that the input terminals can be referred to a first reference potential and the output terminals can be referred to another reference potential which may be quite different in magnitude than that of the input terminals and is in no way related thereto. Stated otherwise, the power of supply used to operate the circuit 6 can be completely independent of the power supply used to produce the input pulse 14 across the input terminals. This gives infinite common mode rejection of undesirable signals from one circuit to the next. In addition to this advantage, the system operates similar to a transformer coupling for AC signals, but unlike a transformer, this system also permits the coupling of DC signals. This obviously gives the advantage of permitting this system of FIG. 1 to be used as an AC or DC amplifier.

Figure 2:
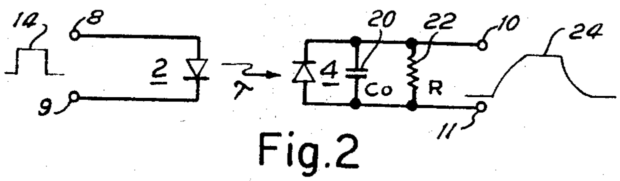
FIG. 2 is an electrical schematic diagram of a simplified version of the equivalent circuit of the system of FIG. 1.

It is desirable that the diode 4 and circuit 6 respond as quickly as possible to the optical radiation to produce the desired output pulse 16 which, stated otherwise, implies that the system should have a very fast response time if required, such as in the case where the circuit is to be used as a wide band amplifier. Thus an analysis of the photosensitive detector diode and the load into which it is connected is necessary in order to determine those parameters which would tend to limit the response time. Referring to FIG. 2, which is a very simplified equivalent circuit of the system shown in FIG. 1, the photosensitive diode 4 inherently has a junction capacitance $C_D$ shown at 20 which can be considered in parallel therewith. The circuit 6 of FIG. 1 is naively shown at 22 as a load resistance R connected in parallel with capacitance 20. When light is directed on the diode, it becomes a current generator, wherein the photocurrent must charge the capacitance. The charge on the capacitor, initially, builds up linearly, as does the voltage, until the voltage thereacross attains a value large enough to cause the current through the resistance 22 to become appreciable with respect to the capacitor current. The ultimate voltage attained across capacitor 20 and resistance 22 depends upon the magnitude of the resistance, wherein a larger resistance results in a larger ultimate voltage than a smaller resistance, assuming the same amount of photocurrent is produced in both cases. The larger output voltage is ordinarily desired in order to achieve a large output pulse. However, it can be seen that a longer time is required to attain the higher voltage, which is undesirable from the standpoint of fast response time. In the simplified equivalent circuit of FIG. 2, the time constant of the output pulse generated across the output terminals 10 and 11 is the product of the capacitance 20 and resistance 22, or $RC_D$. To set forth the objective to be achieved by the invention in the provision of a fast response time circuit having a reasonably large output pulse, it can be stated that a large value of the resistance 22 is undesirable from the standpoint of response time, and as will be described fully below in conjunction with a preferred embodiment of the invention, the load resistance is made effectively small with suitable amplification used to attain a relatively large output. As further considerations, it can be seen that if the voltage to which capacitance 20 is required to be charged is but a very slight amount, the circuit will have a fast response time, with the smaller voltage to which the capacitance is charged resulting in a faster response time. It is this concept which is utilized in the amplifier circuit of the invention to be described below.

Figure 3:
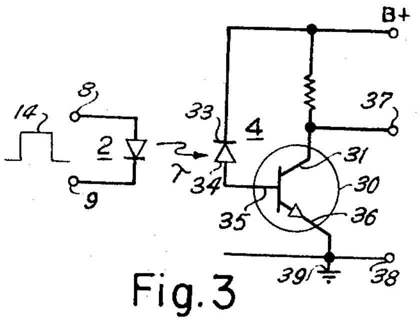
FIG. 3 is an electrical schematic diagram of an optoelectronic switch.

Since the invention is directed, in one aspect thereof, at providing an optoelectronic amplifier to achieve a relatively large output pulse in response to a very small input pulse, the inclusion within circuit 6 of an active device, such as a transistor, is required to produce the necessary amplification. The interconnection of the diode 4 with a transistor is shown in FIG. 3, whereby the anode 34 of the diode 4 is connected to the base 35 of transistor 30, with the transistor being connected in a common emitter configuration. Thus the emitter 36 is connected to ground 39 or some other suitable reference potential, which is normally the lowest potential within the circuit, and a suitable load resistor 32 is connected between the collector 31 and supply potential B+, whereby output terminals 37 and 38 are taken between the collector and emitter, respectively, of the transistor. These terminals can be connected into more circuitry or can represent the outputs 10 and 11 of the circuit 6. The cathode 33 of the diode is connected to B+ to provide the input signal to the base of the transistor. In the absence of a signal across the input terminals 8 and 9 of the light source, there is no radiation directed on the diode 4, and thus no signal to the base of the transistor, and the latter remains in a nonconductive state until light is generated by the light source. When optical radiation is generated and directed on the diode, the diode generates a forward current in response thereto which provides the bias or driving source to the base of the transistor, thus causing it to conduct. This is a straight forward method or scheme for rendering the transistor 30 conductive in response to the optical radiation.

There are several reasons why the circuit of FIG. 3 does not function to provide the stated objective of a very fast response time, and the following explanation of these reasons will more clearly establish the requirements of the preferred embodiment of the pulse amplifier of the invention. The diode produces a sufficient current to the base of the transistor to cause it to saturate when it conducts, thus resulting in a considerable turn-off time when the optical radiation ceases. Moreover, because the transistor amplifies the base signal to produce a relatively large collector-voltage swing, the Miller effect becomes a factor in representing a large effective capacitance in parallel with the diode, thus increasing the response time. Even in view of these drawbacks, however, the circuit of FIG. 3 has an adequately fast response time for some applications, and has the advantage of simplicity in terms of the few components needed, which makes it easy to fabricate within an integrated network.

Figure 4:
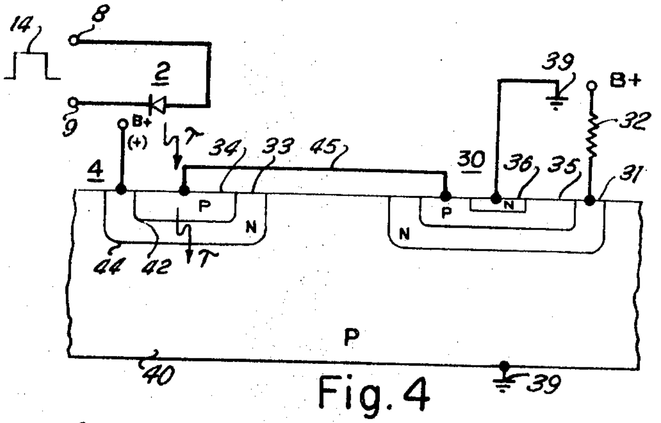
FIG. 4 is an elevational view in section of the adaptation of the circuit of FIG. 3 to a semiconductor integrated network.

Furthermore, the incorporation within a semiconductor network of an optoelectronic circuit such as shown in FIGS. 1 and 3 is, as stated earlier, of primary importance and is one of the objects of this invention. However, it has been found that the incorporation of the circuit of FIG. 3 within a semiconductor network presents problems because of the nature of the semiconductor network construction. These problems can be more clearly described in conjunction with the elevation view in section of a portion of a semiconductor network shown in FIG. 4. The basic construction of the network is the incorporation within a single piece of semiconductor material 40, such as silicon, all of the active devices and components of the circuit by suitable diffusion techniques. The original substrate material 40 is normally connected to the lowest potential, such as ground 39 or signal ground, within the entire network. To incorporate the circuit of FIG. 3 within a network, which is shown in FIG. 4, a photosensitive diode is formed within the substrate material 40, which is normally of p-type conductivity, by diffusing an n-type conductivity determining impurity therewithin to form a region 33, or cathode, separated from the substrate by a rectifying junction 44. Subsequently, a p-type conductivity determining impurity is selectively diffused into a portion of region 33 to form another region 34, or anode, separated from region 33 by a junction 42. Because of junction 44, the diode is electrically isolated from ground potential, or the signal ground to which the substrate is connected. A transistor 30 is formed within the substrate, spaced from the diode, by similar diffusion techniques, wherein three diffusions of alternate conductivity determining impurities are carried out to form the collector 31, base 35, and emitter 36 of an n-p-n transistor. The transistor is also electrically isolated from ground potential because of the junction formed between the collector region 31 and the substrate material. An electrical connection 45 is made between the anode 34 of the diode 4 and the base 35 of transistor 30 to provide the same connection as shown in FIG. 3. Moreover, the cathode 33 of the diode is connected to B+, as is the collector 31 of the transistor through load resistor 32. Finally, the emitter 36 of the transistor is connected to ground, all of which forms the circuit of FIG. 3. Actually, the resistors are also formed within the substrate material, but for the present, they will only be shown schematically. A semiconductor junction light source 2, shown schematically, is positioned above diode 4 and directs optical radiation thereon. The wavelength of light generated by the light source, which is normally in the infrared region of wavelength of approximately .9 microns for a light source comprised of gallium-arsenide, penetrates relatively deep into the substrate material 40, which is silicon. In fact, a relatively large percent of the light penetrates beyond the lower junction 44 separating the cathode 33 of the diode and the original substrate material. Since junction 44 is normally relatively close to junction 42, at least a portion of the minority carriers generated between these two junctions will be collected at junction 44, in addition to those carriers generated beneath junction 44. Thus the problem lies in the existence of a junction 44 which collects some of the charge carriers generated that would otherwise be collected at junction 42 to contribute to the signal. It can be seen that the elimination of junction 44 is desirable, or alternately, spacing it more than at least two minority carrier diffusion lengths from junction 42 will help to a large extent.

One of the broad objects of the invention is to overcome this problem and yet provide an adaptation of a suitable circuit to a semiconductor network that will provide all of the desired functions of the schematic shown in FIG. 1. The basic approach taken to solve the efficiency loss problem just described is shown in the schematic diagram of FIG. 5, wherein the photosensitive diode 4 is now connected between the base of the transistor and ground, or signal ground, potential. The cathode 33 of the dioide 4 is connected to the base 35 of the transistor, wherein, again, a common emitter of configuration is used with the anode 34 of the diode being connected to the same reference potential as the emitter of the transistor. In this case, however, the polarity of the photosensitive diode is reversed and a resistor 50 is connected between B+ and the base of the transistor to establish the transistor 30 in a conductive condition in the absence of optical radiation when the diode 4 is not generating photocurrent. In the presence of optical radiation to cause photocurrent to be generated by diode 4, a sufficient amount of black-current through the base 35 of the transistor results to turn the transistor off, thus providing the desired switching action. In order to do this, resistor 50 must be large enough to limit the base current of the transistor to a magnitude smaller than the photocurrent generated by diode 4. Otherwise, the transistor would not be cut off. As will be referred to later, the diode generates about 10 microamperes of photocurrent, whereas a current to the base of the transistor to cause it to conduct in a stable state is about 2 microamperes.

Figure 5:
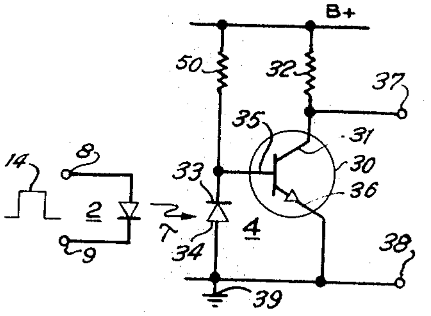
FIG. 5 is an electrical schematic diagram of another optoelectronic switch showing the preferred interconnection of a photosensitive diode with a transistor, the latter of which is responsive to the photocurrent generated by the diode when optical radiation is directed thereon.
Figure 6:
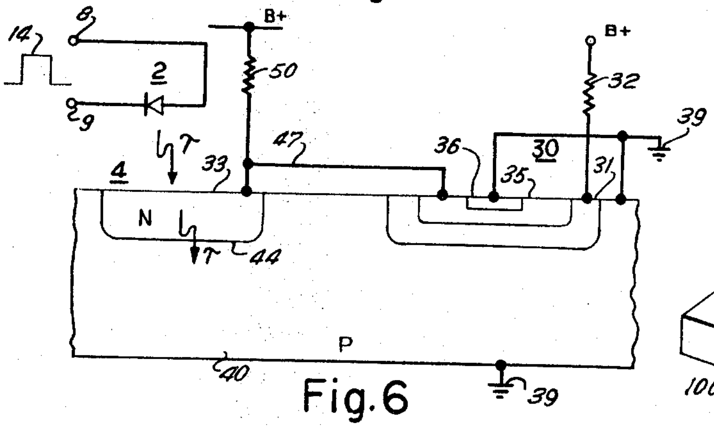
FIG. 6 is an elevational view in section of the adaptation of the circuit of FIG. 5 to a semiconductor integrated network.

The adaptation of the active devices of the circuit of FIG. 5 to a semiconductor network is shown in the elevational sectional view of FIG. 6, wherein the transistor 30 is formed within the substrate material 40 exactly as described before. The diode 4, however, is formed by a single diffusion of an n-type conductivity determining impurity into the p-type conductivity substrate 40 to form a single junction 44. In such case, the diode 4 utilizes the substrate 40 as its anode with the diffused region 33 representing the cathode of the device. This cathode is connected to the base of the transistor by means of electrode 47, and the base 35 of the transistor is also connected to B+ through the biasing resistor 50. The emitter and the substrate are connected to ground potential 39 with the load resistor 32 connected between the collector 31 of the transistor and B+. As can be seen from the biasing connections on the transistor, the transistor will be in a conductive state in the absence of any signal from the photosensitive diode 4 as described in conjunctiton with FIG. 5. In the presence of optical radiation from the light source 2 on the photosensitive diode 4, a photocurrent will be generated in the base of the transistor 30 of a polarity to overcome the base current supplied through resistor 50, and consequently, will cut it off. Unlike the semiconductor configuration of FIG. 4, the embodiment of FIG. 6 does not represent an optical efficiency loss in the same sense. Although the optical radiation from light source 2 penetrates into the network substrate 40 as before, there is only a single junction 44 at which the electron-hole pairs generated by the optical radiation can be collected, which is the active junction of the photosensitive diode. The optical radiation penetrates the substrate to the same depth as in the case of FIG. 4, but in the earlier case, the distance between junctions 42 and 44 is less than a diffusion length of carriers. Moreover, almost all of the light is absorbed within a diffusion length of carriers from junction 42, and the mere existence of the junction 44 between junction 42 and the location where the light is absorbed prevents the collection of the carriers at the active junction 42. This is not the case of the embodiment of FIG. 6, and thus a much greater percentage of the electron-hole pairs generated within the substrate material are collected at active junction 44 in FIG. 6 and are productive of photocurrent for providing a signal to the base of the transistor 30. Therefore, it can be seen that the adaptation of the generalized circuit shown in FIG. 1 to an integrated network preferably takes on a form similar to that shown in FIG. 6, regardless of the nature of the circuit 6 of FIG. 1.

An analysis of the circuit of FIG. 5 shows that the desired fast response time is not achieved, in addition to a further complication encountered, to be discussed below, which makes its adaptation to an integrated circuit impractical. In order for the photocurrent of diode 4 to cut off transistor 30, the base current supplied through bias resistor 50 must be smaller than the photocurrent. Assuming that about 10 microamperes of photocurrent can be generated, which is a typical value, and that the circuit is connected to a supply potential B+ of about 6 volts, also typical, resistor 50 must be in the order of several megohms to limit the operating base current to less than 10 microamperes. The incorporation within an integrated network of a resistor this large would require a very long path within the substrate, since resistors are formed by the diffusion of an impurity within the substrate along a path whose length is one factor which determines the magnitude of the resistance. A more realistic resistance magnitude is required, such as a few thousand ohms, and thus the circuit of FIG. 5 must be redesigned to change this. The response time of the circuit is also greater than desirable. Because of the Miller effect resulting from the voltage gain of the transistor during conduction, an effective capacitance approximately equal to the product of the voltage gain and the collector-base capacitance appears in parallel with diode 4, in addition to its own junction capacitance. The Miller effect capacitance is normally in the order of about 150 picofarads, and thus the time required of the circuit in cutting off the transistor in response to the optical radiation is large. After transistor 30 is cut off, the voltage across diode 4 continues to drop from a reverse bias voltage to a forward bias voltage as a consequence of the continued photocurrent flow through the junction capacitance. In fact, the voltage across the diode will rise to, say, about .6 volt forward bias before levelling off. When the light is turned off, the diode junction capacitance must discharge from the relatively large forward bias voltage all the way until the diode again becomes negatively biased. This causes the decay time of the output pulse across terminals 37 and 38 to be considerably longer than the rise time. This can be corrected by making resistor 50 much smaller (say, a few thousand ohms) so that once transistor 30 is turned off to where no more photocurrent can flow in the base thereof, resistor 50 will be small enough so that the photocurrent continued to be generated can flow therethrough, thus, in effect, clamping the forward voltage rise across the diode and not permitting the junction capacitance to charge to the excessively high positive voltage. Of course, this cannot be effected in the circuit of FIG. 5, since the large resistor is needed, whereas the following embodiment of the invention effectively solves all of these problems. One other factor causing the circuit of FIG. 5 to have a long response time is the fact that small currents are being used to switch transistor 30 off and on, whereby the transistor operating characteristics are such as to give it a relatively slow switching speed under such conditions. In discussing the following embodiments, it should be kept in mind that the response times of the circuits (or time constants) are no longer represented by the simple consideration of the diode junction capacitance and a load resistor, as attested to by the circuit of FIG. 2.

Figure 7:
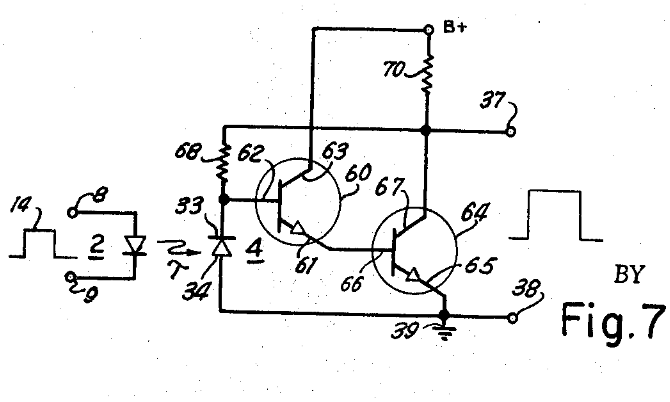
FIG. 7 is an electrical schematic diagram of the basic optoelectronic circuit provided by the invention which embodies a Darlington transistor amplifier configuration utilizing negative feedback with the photosensitive diode connected to the input of the Darlington configuration according to the scheme shown in FIG. 5.

Referring to the circuit shown in FIG. 7, which is a first embodiment of a fast response time circuit of the invention, a modified Darlington configuration of two transistors 60 and 64 is used to provide an increased amplification effect of the input signal to the base 62 of transistor 60 and to effectively eliminate the Miller effect on the charging of a capacitor with the photocurrent. The latter is accomplished since the input transistors act as an emitter follower. In addition, a negative feedback is provided to eliminate the necessity of the very large bias resistor required in the previous circuit. Finally, the transistors in the following circuits to be described are not cut off and on, but rather, the degree of conduction thereof is merely perturbed, thus permitting a much faster response time of the output pulse generated. The two transistors 60 and 64 are connected in a modified Darlington configuration with the emitter 61 of transistor 60 being connected to the base 66 of transistor 64. The emitter 65 of transistor 64 is connected to a signal reference potential, such as ground 39, with the collector 67 thereof being connected to the supply potential B+ through load resistor 70. The collector 63 of transistor 60 is connected directly to the supply voltage B+. The transistors are shown to be of the n-p-n variety, for example, although it is understood that p-n-p transistors can be used. A resistor 68 is connected between the collector 67 of transistor 64 and the base 62 of transistor 60 and provides negative feedback from the output of the circuit to the input base 62 of transistor 60. The photosensitive diode 4 is connected between the base 62 and ground 39 as shown in FIG. 5, with the polarity of diode 4 being such as to be reversed biased in the absence of optical radiation. Therefore, the cathode 33 of diode 4 is connected to the base 62 of transistor 60, with the anode 34 being connected to ground 39. Thus, an operational amplifier is provided with negative feedback between the output and input terminals, with output terminals 37 and 38 being taken from the collector 67 of transistor 64 and ground 39, respectively. The value of resistor 68 is small, such as about 20,000 ohms, for example, and the load resistor 70 is in the order of a few thousand ohms, such as about 4,000–5,000 ohms, for example. A large resistance in the megohm range is not required to properly bias the base of transistor 60, such as was the case in the circuit of FIG. 5, because of the negative feedback used. That is, even though several milliamperes of collector current will flow through transistor 64 during conduction, only a few microamperes, or even less than a microampere, will flow through resistor 68 to the base of transistor 60 to maintain it in conduction. This is the operating condition automatically set up by the feedback configuration. In the absence of optical radiation, the diode 4 will be reverse biased by a voltage equal to the addition of the base-emitter voltages of transistors 60 and 64. When optical radiation is directed on diode 4, it will generate a few microamperes of current, say about 10 microamperes, which will tend to overcome the forward base current supplied by the feedback resistor 68, and would completely cut off transistor 60 if the circuit was constructed as shown in FIG. 5. However, as the photocurrent tends to cut off transistor 60, the potential at collector 67 of transistor 64 rises, thus supplying more forward bias current to the base 62 of transistor 60 to maintain it conducting. For every increment of photocurrent generated by diode 4, the feedback resistor 68 supplies a similar increment tending to offset it, such that the photocurrent generated by the diode simply perturbs the operating conditions of the amplifier and alters the conduction of the two transistors only slightly. This results in a linear amplification of the photocurrent without cutting either of the transistors off. It can be seen that the voltage change across the photosensitive diode is very small, with the feedback resistor 68 handling an excess photocurrent that will be generated to prevent the charging of the diode capacitance, and thus the forward biasing of the dioide, to an excessively large voltage. In fact, the diode remains reverse biased even in the presence of optical radiation, with the reverse bias voltage only being altered slightly. Therefore, when the light is cut off, the circuit will resume its former operating conditions very readily, since only a very small charge is stored in the diode capacitance which is drained off.

This circuit also eliminates the Miller effect insofar as additional capacitances being effectively coupled across the diode. This results from the fact that the collector of transistor 60 is connected to B+, thus yielding no significant voltage gain. Consequently, only the normal base-emitter capacitance of transistor 60 is involved, which is quite small. The photosensitive diode, furthermore, is essentially operating into an effectively small load resistance, since the time constant of the circuit, to a good approximation, is determined by the product of the feedback resistor 68 and the diode junction capacitance divided by the voltage gain of the Darlington transistor amplifier configuration. The response time can, therefore, be very fast, since the gain is relatively high and the magnitude of the feedback resistor is relatively small. At the same time, however, the output pulse taken across output terminals 37 and 38 is relatively large as a result of the linear amplification of the input photocurrent.

Some typical values of the circuit parameters are as follows: The load resistor 70 can be in the order of about 4,000–5,000 ohms, with the feedback resistor being about 20,000 ohms, the latter value being about the largest magnitude resistor than is practical, under most circumstances, to fabricate in an integrated network. The two transistors 6 and 64 can be of the 2N706 variety, which are well known, with the diode 4 having a junction capacitance of about 30 picofarads. With these parameters and a B+ supply potential of 6 volts, the current that will flow through load resistor 70 in the absence of radiation directed on diode 4 will be about 930 microamperes, with the voltage drop between the emitter 61 and base 62 of transistor 60 being about .617 volt, and the base to emitter voltage drop across transistor 64 being about .713 volt. The diode 4 is then reversed biased with a voltage drop of about 1.330 volts with a reverse current of about 1 microampere, wherein this voltage is the addition of the base-emitter voltage drops of transistors 60 and 64. Under these conditions, the current flowing in the base 62 of transistor 60 will be about 0.78 microamperes as supplied through feedback resistor 68 with the current flowing in the base 66 of transistor 64 being about 23.25 microamperes, depending upon the current gain of transistor 60. The voltage drop across the output terminals will be about 1.345 volts.

Assuming that a voltage pulse is applied between terminals 8 and 9 across the light source 2 which will create an intensity of optical radiation sufficient to cause diode 4 to generate about 10 microamps of photocurrent, the voltage across the diode will drop to about 1.328 volts. The forward base current to transistor 60 will be reduced to about 0.75 microampere, with the rest of the photocurrent being offset by an equal amount of current increase through feedback resistor 68. The current flowing in the collector of transistor 64 will be reduced to about 897 microamperes to yield the necessary voltage rise at this collector to cause the additional offsetting current to flow in feedback resistor 68. The output voltage across terminals 37 and 38 will then rise to about 1.545 volts. Thus a voltage change across diode 4 between its "off" and "on" state of only about .002 volt causes an output pulse with a voltage height of about 0.2 volt. The response time of the circuit is given, approximately, by the product of the feedback resistor 68 and the capacitance of the photosensitive diode 4 divided by the actual voltage gain of the circuit. Assuming that the gain of the circuit is about 100, with resistor 68 being 20,000 ohms and the capacitor of diode 4 being 30 picofarads, the response time or rise time of the output pulse, as actually measured in performance, will be from about 0.1 to 0.01 microsecond, or less.

The foregoing parameters and voltage and current values are for illustrative purposes only to give an idea of typical operating conditions, and are in no way intended to limit the invention. From this illustration, however, it can be seen that several objectives are achieved in this circuit, which solves the problems presented in the earlier circuits. Recapitulating, no large value resistors are required which are impractical to fabricate within a semiconductor network. Secondly, the response time of the circuit is extremely fast as a result of the negative feedback arrangement and for the reasons that a very small voltage change occurs across the diode and the transistors are never cut off. Finally, the adaptation of the circuit of FIG. 7 to a semiconductor network is straight forward using the concept shown in FIG. 6, with a pair of transistors being used rather than a single transistor 30.

Figure 8:
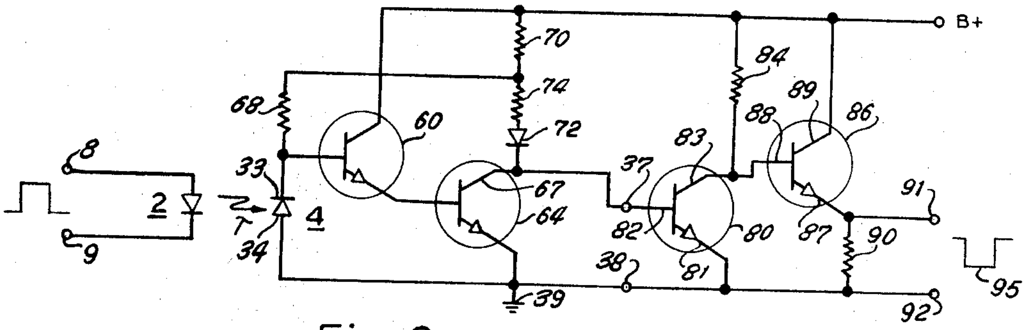
FIG. 8 is an electrical schematic diagram of an amplifier provided by the invention embodying the concept shown in the circuit of FIG. 7 and including additional stages of amplification.

Although the circuit of FIG. 7 provides all of the advantages set forth, the output pulse created thereby has a nominal voltage level at terminal 37 relative to ground 39 of about 1.35 volts. Thus if terminals 37 and 38 are connected directly to the input of another transistor to achieve further amplification, for example, the transistor would be turned on hard into saturation operation even in the absence of optical radiation on the diode 4, since the base voltage would be so high. The conduction of this additional transistor would be affected little, if any, in the presence of optical radiation, with the effect being only to drive the transistor further into saturated operation. To couple the circuit of FIG. 7 into another active device, such as a transistor, the voltage at the output terminals must be adjusted so that the potential levels are proper for driving the additional transistor. This is accomplished in the circuit shown in FIG. 8, in addition to which this circut provides excellent thermal compensation and a high degree of DC stability. The circuit of FIG. 8 is similar to that of FIG. 7 but includes another diode 72 connected between load resistor 70 and the collector 67 of transistor 64, with the cathode of the diode being connected to the collector and the anode being connected to the higher potential. A small resistor 74 can also be included between the anode of the diode 72 and the load resistor 70 for purposes of fine voltage adjustment. Because of the polarity of diode 72, it is forward biased at all times and provides a further voltage drop to lower the potential at output 37 relative to terminal 38. The value of resistor 4, which is normally less than 100 ohms, is chosen to correct the output of potential level to any value desired. Thus the value at terminal 37 can be made sufficiently small in the absence of optical radiation such that when terminals 37 and 38 are connected across the base-emitter of another transistor 80, as shown, a base current will be supplied to base 82 of transistor 80 of only a few microamperes or less. As will be seen, this transistor is cut off relative to its conduction when the light is on, even though this base current does cause some conduction. The transistor 80 has its collector 83 connected through a load resistor 84 to the supply potential B+, and its emitter 81 is connected to ground 39. In the presence of optical radiation directed on the diode 4, the voltage on the collector of transistor 64 will rise to increase the forward current flow in base 82 of transistor 80 by an amount sufficient to cause it to conduct hard, wherein this base current can even be sufficient to cause transistor 80 to saturate. Consequently, the voltage swing at the collector 83 thereof is all the way from approximately B+ potential in the off condition to a very low voltage in the on condition. This range of voltage can, of course, be biased to drive succeeding stages, if desired. For example, the collector of transistor 80 can be coupled into the base 88 of an emitter follower stage comprised of transistor 86 with its collector 89 connected to supply potential and its emitter 87 connected to ground potential 39 through a bias resistor 90. The output is then taken across terminals 91 and 92 connected to the two ends of resistor 90.

Figure 9:
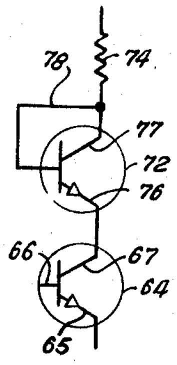
FIG. 9 is an electrical schematic diagram of an alternate embodiment of a portion of the circuit shown in FIG. 8.

The adaptation of the circuit of FIG. 8 to a semiconductor integrated network is also straight forward and simply requires the fabrication of the additional components. However, in semiconductor networks, diodes as such are normally not made, but rather transistors are used as diodes for the simplification of manufacturing, so that the components can be used interchangeably. For example, in the adaptation of the circuit of FIG. 8 to a semiconductor network, the base-emitter diode of a transistor is used to perform the function of diode 72 such as is shown in FIG. 9, wherein a transistor 72 has its emitter 76 connected to the collector 67 of transistor 64, and its base 78 connected and shorted to the collector 77. Since all of the transistors of FIG. 8 are substantially identical, the temperature characteristics of the junctions of the transistors and thus any variations in the parameters thereof will be compensated. That is to say, any variations in the parameters of transistor 60 and transistor 64 are matched against similar variations in the parameters of transistor 72 and transistor 80, thus providing excellent thermal and DC stability of the circuit. It should be noted that the circuit does not have to be adapted to a semiconductor network to achieve this stability, since the characteristics of the devices will be matched anyway.

Figure 10:
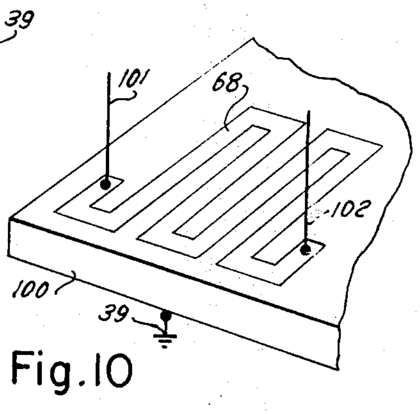
FIG. 10 is a perspective view of a resistor formed within a semiconductor integrated network substrate.
Figure 11:
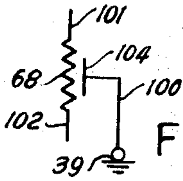
FIG. 11 is an electrical schematic diagram of the equivalent circuit of the resistor shown in FIG. 10, including the effective distributive capacitance associated therewith.
Figure 12:
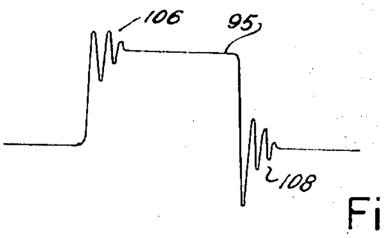
FIG. 12 is a pictorial representation of an output pulse generated by the circuit shown in FIG. 7 when high frequency oscillations result from the interaction of the distributive capacitance shown in FIG. 11.

The circuit described in conjunction wtih FIG. 8 can be used as a DC amplifier that will operate over a very wide bandwidth all the way from the megacycle range down to a DC input. This results from the fact that the circuit has a very fast response time due to the use of the operational amplifier effect wtih a negative feedback, and the fact that both AC and DC signals can be coupled to the photosensitive diode 4 by means of the optical radiation from the light source 2. In addition, the circuit has utility in its application to both conventional electronics using discrete components and integrated networks. Incorporation of the circuit of FIG. 8 into a semiconductor network, however, poses a problem of high frequency operation that does not exist in a conventionally wired circuit containing discrete components. To fabricate a large magnitude resistance in a semiconductor network, the resistor is made, like all other components, by diffusion techniques, wherein a single or double diffusion technique is used to provide a region within the semiconductor substrate that defines a conducting path of a desired resistivity and overall resistance. For larger value resistances, the resistor region within the network takes the form of a tortuous path to give an increased length over a small area to conform to the miniature size concept. The feedback resistor of FIG. 8, for example, is the largest resistor in the circuit and is large enough in magnitude so that a tortuous path must be used in its fabrication, such as shown in the perspective view of a portion of a network of FIG. 10. By suitable photographic masking and etching techniques, an impurity is selectively diffused into a network substrate 100 to provide a region 68 therewithin which is tortuous along its length to yield the required resistance magnitude. Suitable terminals 101 and 102 are attached to the ends of the path to provide the necessary electrical connections to the resistor. Because of its long length, the resistance path defines a substantial area. Since the semiconductor substrate is normally connected to the lowest reference potential of the circuit, such as ground 39, and the resistor path is connected to a different potential, a substantial amount of distributed capacitance exists between the resistor and the semiconductor substrate or ground potential. The degree of this patricular distributed capacitance is, therefore, unique to semiconductor networks or integrated circuits of this type, and is of no consequence in conventional discrete component circuits. The equivalent circuit of the resistor and substrate of FIG. 10 is shown in the electrical schematic diagram of FIG. 11, wherein a capacitor 104 is shown schematically connected at one of its electrodes to ground 39 through the semiconductor substrate material 100 with the resistor 68 forming the other electrode of the capacitor and being connected to a potential different from ground. The effect of this capacitor on the operation of the circuit of FIG. 8 becomes significant at higher frequencies, such as in the several megacycle range, wherein high frequency currents that should be fed back through resistor 68 are shunted to ground by the capacitor. The effect of this capacitor on the voltage pulse applied to transistor 80 between terminals 37 and 38 is to produce oscillations 106 and 108 at the beginning and termination of this pulse as shown in the pictorial representation of an output pulse of FIG. 12. If the entire height output pulse is to be used, these oscillations are obviously undesirable and should be eliminated.

Figure 13:
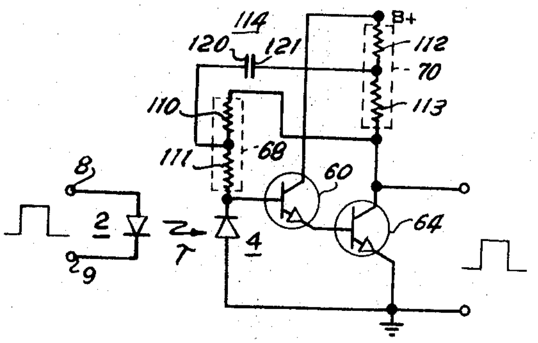
FIG. 13 is an electrical schematic diagram of the basic circuit shown in FIG. 7 including a capacitance shunting the feedback resistance to considerably reduce or eliminate the high frequency instability caused by the distributive capacitance associated with the feedback resistor.

The circuit shown in the electrical schematic diagram of FIG. 13 eliminates this problem at the higher frequencies by providing a capacitor 114 connected between the load resistor 70 of transistor 64 and the feedback resistor 68. Actually, the load resistor 70 is now comprised of two resistors 112 and 113, and similarly, the feedback resistor 68 is now comprised of two resistors 110 and 111, with the capacitor 114 being connected at one of its electrodes 121 to the interconnection of resistors 112 and 113 and at its other electrode 120 to the interconnection of resistors 110 and 111. In a semiconductor network as will be described hereinafter, the resistors do not necessarily have to be discrete from one another, but electrical connections made intermediate the ends thereof to provide the connections for capacitor 114 are adequate. Preferably, the ratio of the resistances of resistor 112 to resistor 113 is the same as the ratio of the resistances of resistor 111 to resistor 110. For example, if resistor 112 is 1,000 ohms and resistor 113 is 4,000 ohms, thus making a ratio of 1 to 4 with an overall load resistance 70 of 5,000 ohms, and the overall resistance value of feedback resistor 68 is 20,000 ohms, then resistor 111 would take on the value of 4,000 ohms and resistor 110 take on the value of 16,000 ohms. The capacitance of capacitor 114 will normally be about 25 picofarads. For DC or low frequency operation, capacitor 114 effectively acts as an open circuit and does not shunt out the resistors 113 and 110. Thus the circuit has the same operation with the same load and feedback resistance values as does the circuit of FIG. 8 at this frequency range. At higher frequencies where the impedance of capacitor 114 becomes less, resistors 110 and 113 are shunted and eventually are substantially shorted out, such that for high frequency operation, the resistors 112 and 111 are the only ones through which any substantial current flows. The effect of this is to greatly reduce the active length of the relatively large magnitude feedback resistor 68 at high frequency operations, such that now only about 1.5 of the length, for example, exists insofar as current flow. This effectively reduces the distributed capacitance by a factor of about 5. Since the same ratio of resistance values of the feedback resistor to the load resistor is maintained at the higher frequency operation, the overall function of the circuit is the same insofar as the operation at these frequencies, except that the oscillations superimposed on the output pulse have been eliminated.

Figure 14:
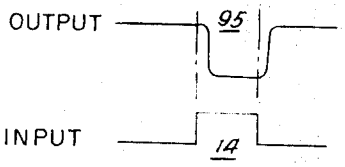
FIGS. 14 and 15 are pictorial representations of two sets of input and output pulses illustrating, respectively, the desired output pulse and an undesirable output pulse from the circuit shown in FIG. 8.
Figure 15:
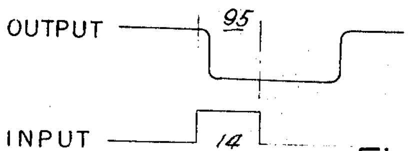

One additional problem is encountered in the very high frequency operation of the circuit shown in FIG. 8. It will be remembered that the voltage swing between terminals 37 and 38 which drives the base of transistor 80 can be sufficient to cause transistor 80 to conduct in saturation in the presence of optical radiation incident on the diode 4. When the light source is cut off, thus tending to cut off transistor 80, a considerable time in relation to the decay time of the input pulse applied across input terminals 8 and 9 is required in order to drain the excess carriers out of the transistor 80 in order to cut it off, which is a result of the conduction of transistor 80 in a saturated mode. The relationships of the input and output pulses of the circuit are shown in FIGS. 14 and 15 for two dffferent cases, wherein the desired output pulse 95 is shown in FIG. 14 as compared on a time basis with the input pulse 14. When the input pulse is first applied, the output pulse will be generated a short time thereafter and will reach its amplitude after a short rise time, wherein the short delay between the initiation of the input pulse and the initiation of the output pulse is due to the small amount of time lag inherent in the overall circuit. When the input pulse is cut off, the output pulse desirably starts to cut off a short time later with a similarly short decay time. However, in the circuit of FIG. 8 under very high frequency operation where transistor 80 is driven all the way into saturation during its conduction, the output pulse, although cutting on with a short rise time as before does not cut off at the termination of the input pulse as before. Rather, a considerable amount of time in relation to the decay time of the input pulse is required in order to drain the transistor 80 of the excess carriers stored during the saturated operation in order to cut it off, as shown in FIG. 15. The elimination of the saturated operation of transistor 80 by conventional means, such as clamping the base input voltage to a value to prevent saturated operation, does not completely eliminate the delayed response of the output pulse, as will be seen hereinafter, although the saturation condition must be eliminated also.

Figure 16:
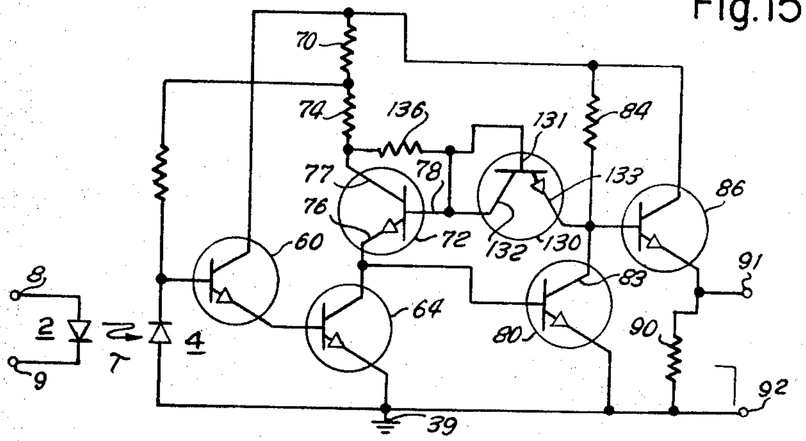
FIGS. 16 and 17 are electrical schematic diagrams of improved amplifier circuits embodying optoelectronic coupling, with FIG. 17 representing the preferred circuit to be adapted to a semiconductor integrated network.

Referring to FIG. 16, there is shown a circuit that prevents saturation of transistor 80 and, in addition, allows the circuit to operate with a very fast response time at very high frequencies. Several well known techniques are available for preventing saturation of a transistor. For example, a diode can be connected between the base 82 of transistor 80 and some reference potential, so that as transistor 80 is turned on, current will be supplied to the base until the diode comes sufficiently biased to shunt any further current increases that would tend to cause saturated operation. If this means is used in the circuit of FIG. 8, however, the same total amount of current is being supplied to the clamping means connected to the base of transistor 80 by the preceding stages of the circuit through the load resistor 70. It will be remembered that the feature of the feedback scheme which permits fast operation is that the current through resistor 68 increases accordingly with the increase in photocurrent generated by diode 4, so that the diode capacitance is not charged to a high voltage. Should a considerable portion of the current passing through load resistor 70 that would ordinarily be supplied through feedback resistor 68 to compensate for the additional photocurrent be directed through the clamping means on transistor 80, the feedback loop will no longer function properly. As a consequence thereof, the forward bias on the diode becomes greater, as does the voltage across its junction capacitance which, in itself, lengthens the response time of the circuit. Thus the problem is twofold and requires not only the elimination of saturated operation of transistor 80 but also the elimination of undue current drain on the preceding circuitry operating into an excessively large load, or small load resistance.

The circuit shown in FIG. 16, which is the same as the circuit of FIG. 8 except that it includes some additional components, eliminates the foregoing problems by providing a diode 130 connected between the collector 83 of transistor 80 and the collector circuit of transistor 64. Diode 130 also takes on the form of a transistor with its base 131 connected directly to its collector 132, such as in the case where this circuit is adapted to a semiconductor network, so that the base-emitter diode of the transistor 130 acts as a diode. The diode (or transistor) 130 has its emitter 133 connected to the collector of transistor 80 and commonly connected base-collector connected to the base 78 of transistor 72. As described in conjunction with FIG. 9, diode 72 can also be the base-emitter diode of a transistor. However, unlike the circuits of FIGS. 8 and 9, a resistor 136 is connected between the base and collector of transistor 72 so that the device now acts as a transistor but also sustains the necessary voltage drop as did diode 72 in FIG. 8. The operation of the circuit is as follows: Transistor 130 is nonconductive when transistor 80 is nonconductive because of the reverse bias potential applied to the emitter 133 relative to its base 131. However, as transistor 80 turns on and its collector potential drops below the potential on base 131 of transistor 130, transistor 130 will conduct to create a feedback path from the collector 83 of transistor 80 to the collector circuit of transistor 64 through transistor 72. The action of transistor 72 is twofold. First, transistor 72 acts as an emitter follower through the base-emitter thereof. Transistor 72 is conducting at all times, and when optical radiation is directed on diode 4 causing the collector potential of transistor 64 to rise to cut on transistor 80, transistor 130 will eventually turn on as the collector potential of transistor 80 drops. This dropping potential is fed to the base 78 of transistor 72, and as a result, the emitter 76 thereof follows this potential, as does the collector of transistor 64. In effect, this negative feedback holds the collector potential of transistor 64, and thus the base potential of transistor 80, at a value small enough to prevent saturation of transistor 80. In the circuit of FIG. 8, it was seen how the rising collector potential of transistor 64 caused the negative feedback to the base of transistor 60. However, this collector is now clamped at a given voltage. The second function of transistor 72, is, therefore, to provide a rising potential at its collector 77 to replace the collector function of transistor 64. This is accomplished by the amplification effect through the base-collector of transistor 72 because of resistor 136 connected therebetween. Thus the proper feedback to the base of transistor 60 is maintained to achieve the proper operation, while at the same time, transistor 80 is prevented from going into saturation.

Figures 17, 20, 22:
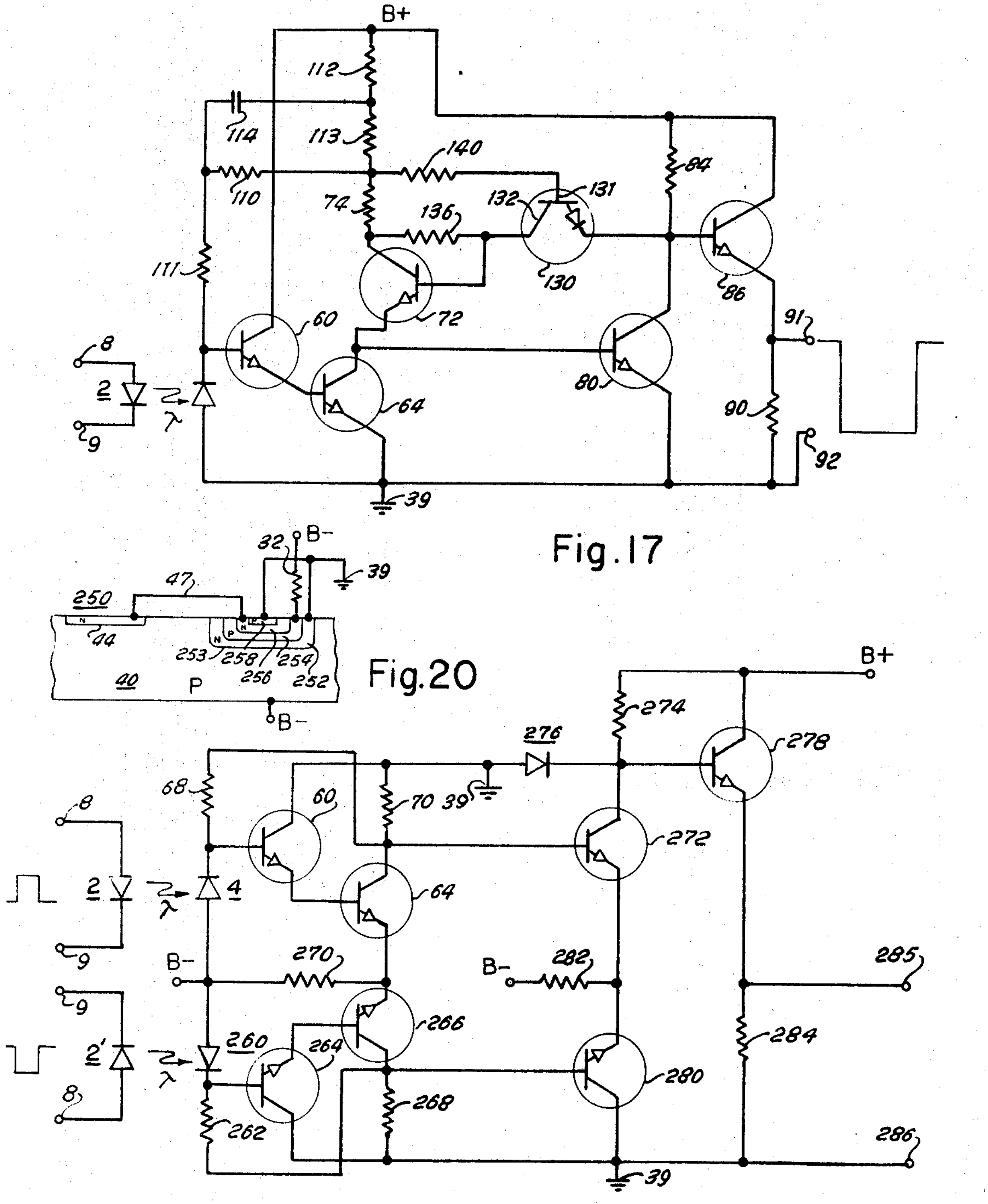
FIG. 20 is an elevational view in section of the adaptation of another embodiment of the invention to an integrated network.
FIG. 22 is an electrical schematic diagram of a differential amplifier utilizing the basic circuit shown in FIG. 7.

A final improvement in the amplifier circuit over that shown in FIG. 16 is shown in the electrical schematic diagram of FIG. 17, wherein this circuit is shown to contain all of the improvements of the preceding circuits and constitutes the preferred embodiment of the wideband DC amplifier of the invention. As shown, it includes the capacitor 114 to eliminate high frequency oscillations at the output, previously described, and the negative feedback voltage clamping and amplification subcircuit connected between the collector circuits of transistor 80 and transistor 64, just described. The final improvement in this circuit over the others constitutes a resistor 140 connected between the base 131 of transistor 130 and the interconnection of resistors 113 and 74, thereby eliminating the shorting together of the base 131 and the collector 132 of transistor 130. The reason for this is to eliminate unnecessary capacitance which would tend to slow the response time of the circuit caused by the Miller effect of transistors 72 and 80, especially the latter. This occurs because of the emitter-base capacitance of transistor 130 when connected as a diode in FIG. 17, whereby the equivalent capacitance existing at the collector of transistor 64 is approximately equal to the product of this capacitance, the voltage gain of transistor 80, and the current gain of transistor 72. By connecting a resistor 140 between the base of transistor 130 and the collector circuit of transistor 72, the base 131 will act as a guard or shield to prevent charging of the capacitance existing in transistor 130. The magnitude of the resistor is about 2,000 ohms, for example, which is large enough to preclude a substantial current flow but small enough to act at a guard connection.

As just described, the embodiment shown in FIG. 17 includes all of the several improvements previously described and is the preferred embodiment for the wideband DC pulse amplifier of the invention. Although this circuit has utility in of itself as applied to conventional electronics using discrete components, it is also designed to be integrated in a semiconductor network. The adaptation of the circuit of FIG. 17 to a semiconductor network is shown in the plan view of FIG. 18 and the elevational view in section of FIG. 19, taken across section lines 19—19 of FIG. 18. For purposes of clarity, the plan view of FIG. 18 does not include the light source 2 so that the diode 4 can be seen, although the sectional view of FIG. 19 does show the light source. Referring to both FIGS. 18 and 19, there is shown in FIG. 19 the semiconductor junction diode light source 2 comprised of gallium-arsenide or other material as described in the above noted copending Biard et al. application. The light source 2 is comprised of an n-type conductivity wafer 152 of gallium-arsenide, which is the cathode of the device, into which is diffused a p-type conductivity determining impurity to form a p-type anode region 154. A suitable electrode 155 is attached to the anode region 154 and another electrode 156 is attached to the n-type cathode region 152, whereby these two electrodes are connected to input terminals 8 and 9, respectively. When a forward current is passed through the junction between the p-type and n-type regions 154 and 152, such as by the application of a voltage pulse to input terminals 8 and 9, optical radiation is generated at the junction of the light source which has a wavelength normally in the infrared region, depending upon the composition of material of the light source, and is directed out of the diode through the n-type region 152. The light source is positioned above the photosensitive diode 4 which is formed within the semiconductor network substrate 40, the latter of which is normally comprised of a wafer of p-type conductivity silicon. The light source 2 is separated from the semiconductor network substrate by means of a layer of optically transparent material 158 comprised of some suitable glass composition, such as described in the copending Biard et al. application entitled Electrostatically Shielded Optoelectronic Device, filed concurrently herewith, Ser. No. 379,443, and assigned to the same assignee. As noted earlier, the photosensitive diode 4 uses the p-type conductivity determining semiconductor network substrate 40 as the anode 34, into which there is diffused an n-type conductivity determining impurity to form an n-type cathode region 33 of the device. Preferably, the photosensitive diode 4 shown in FIGS. 18 and 19 is an improved embodiment over that shown in FIG. 6 and is described in detail in the last-mentioned copending application of Biard et al, filed concurrently herewith.

As described in that application, the fact that the light source 2 is physically positioned very close to the diode 4 introduces a distributed capacitance between the two devices which will couple undesirable AC signals between the ground terminal 9 of the light source and the signal or cathode region 33 of the photosensitive diode unless proper shielding is used. As described in the last-mentioned copending Biard et al. application, the necessary shielding is effected by diffusing a p-type conductivity determining impurity into the n-type region 33 and into the top surface of the original substrate material to form a p-type region 160 overlaying the region 33 and forming a continuation of the p-type anode region 34. Only a small channel 162 as shown in FIG. 18 is masked against this diffusion, and, subsequently, an n-type conductivity determining impurity is selectively diffused into channel 162 to form a narrower $n+$ region 164 extending into and making electrical contact with the n-type cathode region 33. The $n+$ region 164 extends beyond the cathode 33 so that an electrode can be attached to its extreme end. A layer of silicon oxide 166 is selectively formed over the surface of the semiconductor substrate. This oxide layer is not formed over the portion of the surface of p-type region that overlays cathode 33 nor an annular area surrounding this surface, but is formed over and overlays region 162. Subsequently, an electrode 168 is selectively formed over the oxide layer and the annular surface of p-type region 160 surrounding cathode 33, in addition to which, the electrode 168 is formed on top of the oxide tab overlaying region 162. This electrode is preferably comprised of aluminum. An aluminum electrode 170 is also formed on the extreme exposed end of $n+$ region 164 to make contact therewith which, in turn, makes contact with cathode 33.

It can be seen from the description of the photosensitive diode 4 that the n-type cathode region 33 is almost completely buried within or surrounded by the p-type anode region 34 defined by the diffused region 160 and the original substrate material 40. Since the original substrate of the semiconductor network is usually connected to the lowest potential within the circuit, such as signal ground 39, the n-type cathode region 33 is electrostatically shielded from any signals that would tend to be coupled thereto by means of the distributed capacitance between the light source 2 and the diode 4. Therefore, only those signals which are transferred by means of the optical radiation are coupled to the signal portion of the diode detector.

Figure 18:
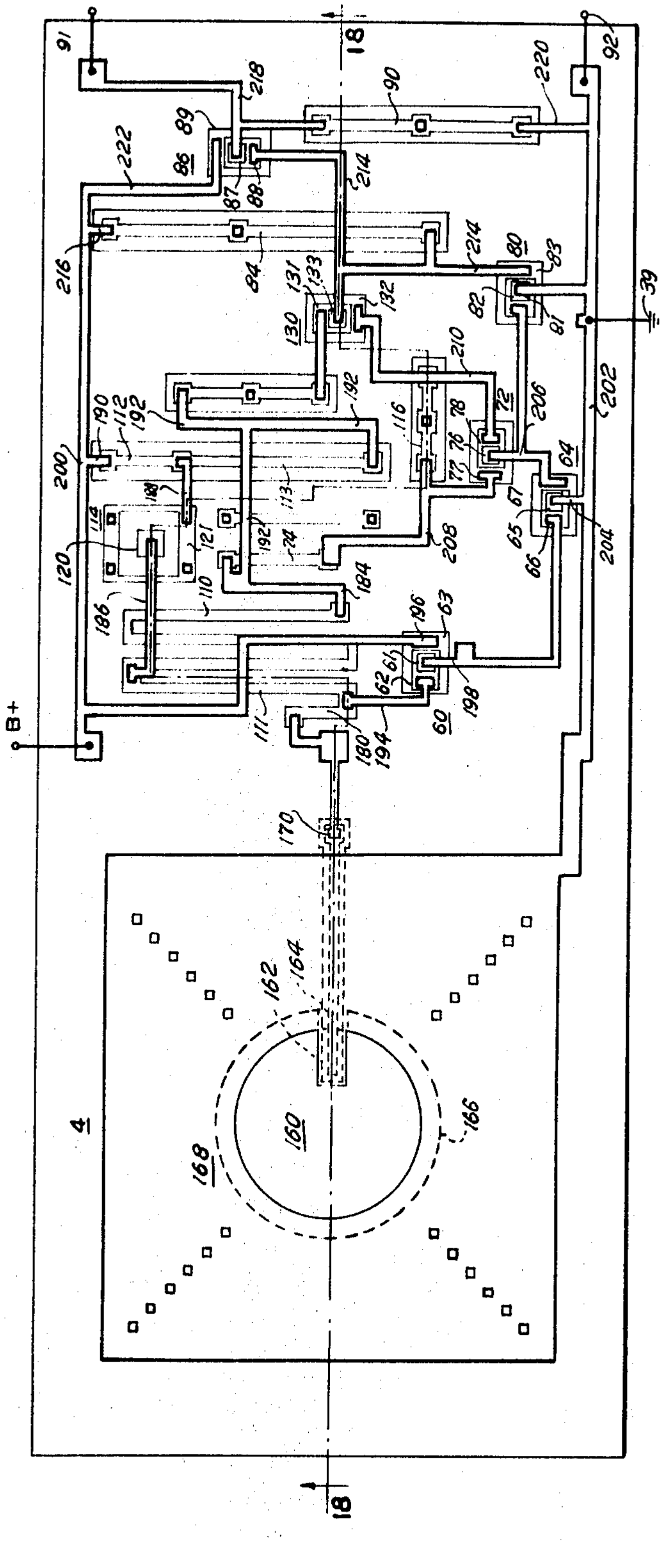
FIG. 18 is a plan view of the embodiment of the circuit shown in FIG. 17 to a semiconductor integrated network.
Figure 19:
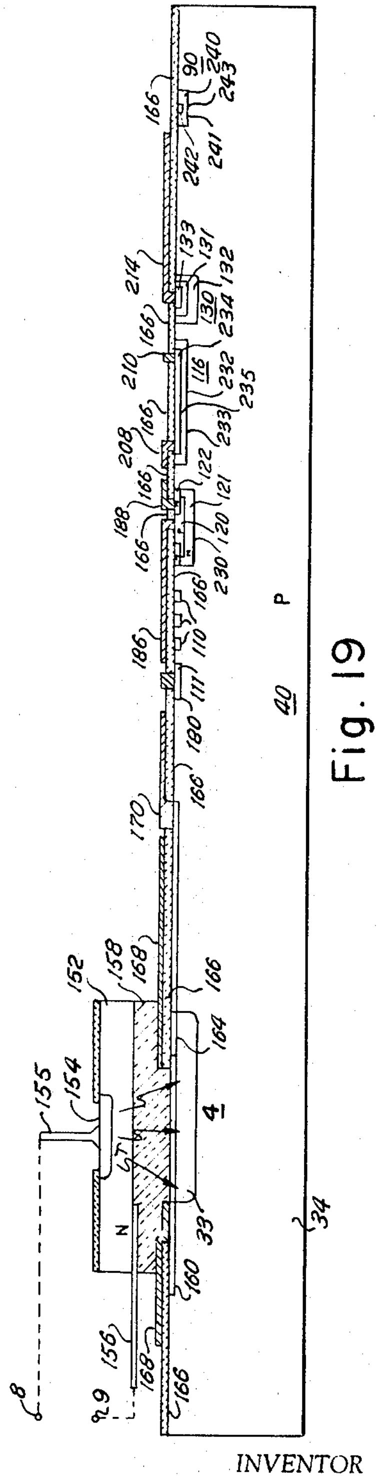
FIG. 19 is an elevational view in section of the network shown in FIG. 18 taken across section lines 19—19 thereof.

Referring now to the adaptation of the circuit shown in FIG. 17 to the integrated network, as shown more clearly in the plan view of FIG. 18, the cathode 33 of the diode 4 is connected to a small resistor 180 of about 1,000 ohms, which is integral with the resistor 111. The anode of the diode 4 which is actually the original substrate material 40 is connected to ground 39. The resistor 111 forms a part of the entire feedback resistor 68, and is integral with resistor 110 forming the other part of the feedback resistor. Resistor 110 is connected at its other end to the small resistor 74 by means of a metallic electrode 184. Connected between resistors 111 and 110 is an electrode 186, which is connected at its other end to one electrode 120 of capacitor 114. The other electrode 121 of capacitor 114 is connected to the intermediate point of resistors 112 and 113 by an electrode 188, wherein the other end of resistor 112 is connected to the supply potential B+ by means of electrodes 190 and 200. Resistor 113 is connected at its other end to resistor 110 and resistor 74 by means of an electrode 192. The cathode 33 of diode 4 is also connected to the base 62 of transistor 60 by means of an electrode 194 through the 1,000 ohm resistor 180. An electrode 196 connects the collector 63 of transistor 60 to B+ through electrode 200, and an electrode 198 connects the emitter 61 of transistor 60 to the base 66 of transistor 64. An electrode 204 connects the emitter 65 of transistor 64 to ground potential 39 through an electrode 202, with an electrode 206 connecting the collector 67 of transistor 64 to the emitter 76 of transistor 72. The bottom end of resistor 74 is connected to the collector 77 of transistor 72 by means of an electrode 208, which electrode also connects resistor 74 to one end of resistor 116. The base 78 of transistor 72 is connected by means of an electrode 210 to the collector 114 of transistor 112 and to the other end of resistor 116. The electrode 206 also connects the collector 67 of transistor 64 and the emitter 76 of transistor 72 to the base 82 of transistor 80, and an electrode 212 connects the emitter 81 of transistor 80 to ground potential 39. The collector 83 of transistor 80 is connected to the emitter 133 of transistor 130, one end of load resistor 84, and the base 88 of transistor 86 by means of electrode 214. The other end of load resistor 84 is connected to B+ through electrode 216. The emitter 87 of transistor 86 is connected by means of electrode 218 to one end of resistor 90 and to the output terminal 91, and the other end of resistor 90 is connected to ground 39 by electrode 220. Finally, an electrode 222 connects the collector 89 of transistor 86 to B+.

The elevational view in section of FIG. 19 is taken along section lines 19—19 of FIG. 18, and although it does not show a section of each of the integrated components of the semiconductor network depicted in FIG. 18, the section view does show representative components. For example, in fabricating a semiconductor network, a wafer 40 of p-type conductivity silicon is normally used as the substrate material, and impurities are selectively diffused into the substrate to form the desired components. To fabricate resistors within the network, either single or double diffusions can be made to form a region which defines a conducting path for the resistor, wherein these regions have a higher electrical resistivity if large resistors are desired, and have a lower resistivity if lower value resistors are required, in addition to which, the length of the resistor path affects the resistance. For example, the resistors 110 and 111, which comprise the feedback resistor 68, are formed within the substrate 40 by selectively diffusing therein an n-type conductivity determining impurity to define a tortuous path as shown. The restivity of this region is selected to be relatively high in order to yield a high value resistor. Also shown in FIG. 19 is the capacitor 114, which is formed by three diffusions as follows: an n-type conductivity determining impurity is selectively diffused within an opening in the oxide 166 to form a region 121. Subsequently, a p-type conductivity determining impurity is diffused into region 121 to form a p-type region 120 and, finally, another n-type conductivity determining impurity is diffused into a portion of the p-type region 120 to form a region 122 which connects with region 121 but does not extend all the way across region 120. Thus the combined regions 121 and 122 act as one electrode of the capacitor, and region 120 acts as the other electrode of the capacitor. A hole is selectively etched into the oxide so that an electrode 186 can be made to contact the region 120, and, similarly, another hole is provided in the oxide so that electrode 188 can connect with the n-type region 122. The rectifying junction 230 between region 121 and the substrate 40 electrically isolates capacitor 114 from the substrate.

An example of another resistor 116 is shown in FIG. 19 and is formed within the substrate by a double diffusion as contrasted to the single diffusion of the resistors 110 and 111. Here, an n-type conductivity determining impurity is diffused into the substrate to form a region 232 separated from the substrate by junction 233, and a p-type conductivity determining impurity is then diffused into region 232 to form a smaller p-type region 234 separated from region 232 by junction 235. Holes are made in the oxide so that electrodes 208 and 210, respectively, can be attached to the ends of the resistor region 234. Any potential polarity relative to ground can be applied to electrodes 208 and 210, since the junction 233 acts as an open circuit to prevent the resistor 116 from being electrically connected to the substrate 40. In the case of resistors 110 and 111, however, the potentials applied to these resistors must be positive relative to ground in order that the junction separating these resistor regions will be reversed biased to prevent shorting to substrate 40. An end view of resistor 90, constructed similarly to resistor 116, is shown and comprises an n-type conductivity region 240 separated from the substrate 40 by junction 241, and a narrower region 242 of p-type conductivity separated from region 240 by junction 243. Region 242 acts as the resistor as previously described. Finally, a section view of transistor 130 is shown, which is formed by three successive diffusions of alternate conductivity type determining impurities to form an n-p-n structure, with the collector of the transistor comprising an n-type conductivity region 132, the base comprising a p-type conductivity region 131, and the emitter comprising an n-type conductivity region 133. Similarly, holes are cut in the oxide 166 so that electrical contacts to the various regions can be made, such as electrode 214 contacting emitter 133.

Figure 21:
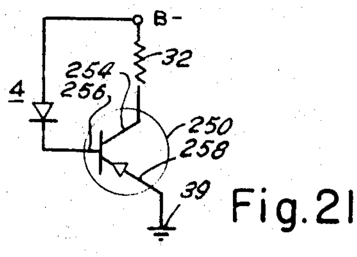
FIG. 21 is an electrical schematic diagram of the embodiment of FIG. 20.

All of the above circuits, when adapted to integrated networks, utilize the single diffused detector diode concept as shown in FIG. 6 to more efficiently collect the charge carriers generated by the light, wherein the network substrate constitutes one of the active regions of the detector. In using a detector diode in this manner where both active regions are not electrically isolated from the substrate by an additional junction, it was seen that the simple circuit of FIG. 3 could not be used because of the polarities involved. However, as stated earlier, the circuit of FIG. 3 is sufficiently fast in some applications and is desirable because of the relatively few components required. To take advantage of both the concept of the detector diode shown in FIG. 6 and the circuit configuration of FIG. 3, the invention provides another embodiment to be adapted to an integrated network shown in the elevational view in section thereof in FIG. 20, and the electrical schematic diagram of FIG. 21. In FIG. 20, the detector is fabricated as shown in FIG. 6, or more preferably as shown in FIG. 19, wherein the electrical isolation junction 44 shown in FIG. 4 is not used. The substrate is again p-type conductivity in this example, wherein a p-n-p transistor 250 is used rather than the n-p-n transistor shown in FIG. 6. To form the transistor, however, four successive diffusions of alternate conductivity type determining impurities are required, so that the p-type collector is electrically isolated from the p-type substrate by an isolation junction. Referring to FIG. 20, a first diffusion is made to form an n-type region 252 in substrate 40 separated therefrom by junction 253. Then, successive diffusions are made to form the p-type collector region 254, n-type base region 256 and p-type emitter region 258 within region 252. The n-type cathode 33 of the detector is connected to the base 256 of transistor 250 by an electrode 47, with the anode of the detector, which is also the substrate 40, being connected to B− supply potential. The collector 254 is also connected to B− through load resistor 32, whereas the emitter 258 is connected to ground 39. Finally, the isolation region 252 is also connected to ground 39 to reverse bias junction 253 to maintain electrical isolation of transistor 250 with the substrate. It is then apparent that the polarities are such as to give a switching circuit as shown in FIG. 3 because of the use of a p-n-p transistor formed by a quadruple diffusion process, while at the same time, the advantageous detector construction as shown in FIG. 6 is also utilized. It should be remarked at this point that an n-type network substrate can be used just as well with a single p-type diffusion being made to form the anode of the detector. In this case, a quadruple diffusion is again used to form an n-p-n transistor, with all of the conductivity types being reversed from that shown in FIG. 20. All of the B− supply potential connections will also be interchanged with B+ connections with the ground connections remaining the same, thus providing a circuit equivalent to that shown in FIG. 21.

The basic concept utilized in the circuit shown in FIG. 7 can also be applied to other circuits, such as the differential amplifier shown in the electrical schematic diagram of FIG. 22. It will be helpful to compare the differential amplifier, to be described below, with the DC amplifier shown in its preferred embodiment of FIG. 17. The DC amplifier of FIG. 17 is single ended in the sense that it requires but a single power supply, which is very advantageous in many applications. However, since it does not operate on the basis of differential signals in the strict sense that is used in a differential amplifier, it requires the use of the voltage adjusting diode 72 and the devices which maintain the feedback system properly operational. Moreover, the output pulse of this amplifier is adjusted to a nominal voltage of just above ground to properly drive succeeding transistor stages. The differential amplifier requires the use of two potential supplies, one negative and one positive, relatively speaking, and the absolute magnitudes of the voltage levels are of less consequence.

The differential amplifier circuit shown schematically in FIG. 22 is characterized by the same fast switching time as previously described because of the use of the basic feedback operation. Thus the top half of the input circuit is identical to that shown in FIG. 7, wherein the amplifier includes a second half identical to this comprising a first transistor 264 with its emitter connected to the base of a second transistor 266. Another photosensitive diode 260 is connected between the base of transistor 264 and a reference potential, wherein a feedback resistor 262 is connected between this diode and the collector of transistor 266. The collector of transistor 266 is connected to another reference potential through a load resistor 268.

The emitter of the two transistors 64 and 266 are commonly connected to a negative reference potential source B− through a bias resistor 270, whereas the collectors of these transistors are connected to a relatively positive supply potential, or ground, through their respective load resistors. A pair of electrically independent light sources 2 and 2′ are used to drive the two detector diodes 4 and 260, respectively, with the output of the two stages being taken from the collectors, respectively, of transistors 64 and 266. These two outputs are used to drive transistors 272 and 280, respectively, for further amplification, wherein these transistors correspond to transistor 80 of FIG. 17. The emitters of transistors 272 and 280 are commonly connected to B— supply through a bias resistor 282, which is signal ground, with the collector of transistor 280 being connected to ground. Thus these two transistors can operate in push-pull fashion on a differential signal, without reference to the absolute magnitude of the voltages. A final emitter-follower stage is used, as before, and comprises a transistor 278 having its base connected to the collector of transistor 272, its collector connected to B+ supply, and its emitter connected to ground through a resistor 284. The collector of transistor 272 is also connected to B+ through a resistor 274, and also to ground 39 through a diode 276, wherein the anode of the diode is connected to ground. The output terminals 285 and 286 of the amplifier are taken across resistor 284.

The collector of transistor 272 is not connected to ground as is the collector of transistor 280, since the output signal is derived from this point. In the absence of optical radiation, the sum of the currents flow through transistors 272 and 280 is relatively constant as determined by resistor 282 and the negative power supply voltage, with the current being divided approximately equally between the two transistors. Under these conditions, diode 276 is reverse biased because of the proper choice of resistor 274. An input signal between terminals 8 and 9 of the light source 2 causes transistor 272 to conduct more of the current supplied by resistor 282, and causes transistor 280 to conduct less of this current. This causes the collector voltage on transistor 272 to drop to a level where diode 276 becomes forward biased to conduction. In this manner the collector of transistor 272 can draw as much current as necessary from ground 39 to prevent saturation of the transistor. Transistor 280 obviously will not saturate, since its collector is tied to ground. The reverse action occurs when a signal is applied between terminals 8′ and 9′ of light source 2′. The circuit does not require the use of the negative feedback means as shown connected between transistor 80 and the collector circuit of transistor 64 in FIG. 17, since the feedback portions of the input stages remain properly operational. This results from the use of differential signals and resistor 282 connected in the emitter circuits of transistors 272 and 280. Thus when either of transistor 272 or transistor 280 is caused to conduct more heavily in response to an input signal, the resistor 282 limits the amount of emitter current that can flow, which determines the amount of base current. This is not the case of the circuit of FIG. 17 where the emitter of transistor 80 is connected to ground. Therefore, there is no overloading of the preceding stages in the circuit of FIG. 22. If a single input is required, the light source 2′ can be eliminated and the photosensitive diode 260 replaced by a capacitor about equal to the junction capacitance of diode 4, wherein this use of this capacitor gives the bottom half of the circuit the same frequency response as the top half. Other variations, including the addition of more amplification, can be made, as will be recognized.

The invention has been described with reference to preferred embodiments thereof, although because of the large number of applications of the invention, the number of embodiments shown has necessarily been limited. However, many modifications, substitutions and additional applications that do not depart from the true scope of the invention will undoubtedly occur to those skilled in the art, and it is intended that the invention be limited only as defined in the appended claims.

What is claimed is:

1. An optoelectronic system comprising:

(a) a semiconductor body containing a plurality of interconnected components forming an integrated circuit, said body having a substrate region therein of one conductivity type;

(b) a first discrete region within said body extending to a surface thereof and having a conductivity type opposite to that of said substrate region;

(c) photodetection means comprising a photosensitive p-n junction formed by said substrate region and said first discrete region of opposite conductivity type, for generating an electric signal responsive to radiation incident thereon;

(d) a second discrete region within said body having the same conductivity type as said first discrete region, extending to the said surface of said body, and forming a p-n junction with said substrate region; and (e) semiconductor junction amplification means within said second discrete region, interconnected with said photodetection means, for amplifying said electric signal.

2. A system as defined by claim 1 further comprising semiconductor means for generating and directing radiation upon said detector means.

3. An optoelectronic system comprising:

(a) a body of semiconductor material containing a plurality of interconnected components forming an integrated circuit within said body, (b) said body of semiconductor material being of a first electrical conductivity type and said plurality of components defining selected regions of first and second electrical conductivity type separated by rectifying junctions, (c) one of said components comprising a diode having first and second regions separated by a rectifying junction with said first region being of said second conductivity type and said second region comprising a portion of said body of semiconductor material of said first conductivity type, and (d) means for generating optical radiation directed on said diode having a wave length such that at least a portion of said radiation is absorbed within said diode to generate charge carriers which are collected at the rectifying junction thereof, said means comprising a semiconductor device containing a rectifying junction, and said optical radiation is generated within said device in response to an electrical current flow in the forward direction across the rectifying junction thereof, and (e) a second of said plurality of components comprising a transistor having collector, base and emitter regions with said collector in said emitter being of said second conductivity type and said base being of said first conductivity type, said first region of said diode is interconnected with said base region, a first reference potential interconnected with said second region and said emitter, and a second reference potential interconnected with said first region, said base and said collector, said first and second reference potentials having polarities for biasing said diode.

4. An optoelectronic system according to claim 3 including another rectifying junction electrically isolating said transistor from said body of said first conductivity type and being reverse biased by said first and said second reference potentials.

5. An optoelectronic system according to claim 4 wherein said means comprises a semiconductor device containing a rectifying junction and a pair of input terminals connected to said device for conducting a forward current through the rectifying junction thereof in response to an electrical signal applied to said pair of input terminals, and said optical radiation is generated within said device in response to said forward current.

6. An optoelectronic system comprising:

(a) a body of semiconductor material containing a plurality of interconnected components forming an integrated circuit within said body, (b) said body of semiconductor material being of a first electrical conductivity type and said plurality of components defining selected regions of first and second electrical conductivity types separated by rectifying junctions, (c) one of said components comprising a diode having first and second active regions separated by a rectifying junction with said first region being of said second conductivity type and said second region comprising a portion of said body of semiconductor material of said first conductivity type, (d) means for generating optical radiation directed on said diode having a wave length such that at least a portion of said radiation is absorbed within said diode to generate the charge carriers which are collected at the recitfying junction thereof, said means comprising a semiconductor device containing a rectifying junction, and said optical radiation is generated within said device in response to an electrical current flow in the forward direction across the rectifying junction thereof, and (e) a second of said plurality of components comprises a transistor having a collector, a base and emitter regions with said collector and said emitter being of said first conductivity type and said base being of said second conductivity type, said first region of said diode is interconnected with said base region, a first reference potential interconnected with said emitter region, and a second reference potential interconnected with said second region and said collector, said first and said second reference potentials having polarities for reverse biasing said diode.

7. An optoelectronic system according to claim 6 including another region of said second conductivity type separating said transistor from said body of said first conductivity type and forming another rectifying junction with said body which is reverse biased by said first and said second reference potentials.

8. An optoelectronic system comprising:

(a) a first relatively small gain semiconductor amplifier means having an input, (b) a second relatively large gain semiconductor amplifier means interconnected with and being driven by said first means and having an output, (c) negative feedback means connected between said said input and said output, (d) a third semiconductor device means connected to said input and containing a rectifying junction, (e) said third device means producing an electrical signal at said input in response to optical radiation being absorbed therein to generate charge carriers which are collected at said rectifying junction, and (f) a fourth semiconductor device means for generating optical radiation directed on said third device means having a wave length such that at least a portion of said radiation is absorbed within said third device means to generate charge carriers which are collected at said rectifying junction.

9. An optoelectronic system according to claim 8 including a supply potential and a reference potential wherein said first and said second means comprises first and second transistors, respectively, a first active region of said first transistor is connected to a first active region of said second transistor, a second active region of said first transistor is connected to a said supply potential, a second active region of said second transistor is connected to said reference potential, said second means includes a load resistor connected between said supply potential and a third active region of said second transistor, said negative feedback means comprises a feedback resistor connected between said third region of said second transistor and a third active region of said first transistor, and said third semiconductor device means comprises a diode connected between said third region of said first transistor and said reference potential.

10. An optoelectronic system according to claim 9 wherein said fourth means includes a pair of terminals and generates said optical radiation in response to a voltage applied between said terminals, said first and said second transistors are conductive in the absence of optical radiation directed on said diode, said diode is reverse biased, and said signal produced by said diode at said input renders said first and said second transistors less conductive.

11. An optoelectronic system according to claim 9 including another forward biased diode connected between said third active region of said second transistor and said load resistor to lower the magnitude of the voltage at said output in relation to said supply potential.

12. An optoelectronic system comprising:

(a) a first transistor having an input, (b) a second transistor interconnected with and being driven by said first transistor so that increases and decreases in the conduction of said first transistor causes corresponding increases and decreases in the conduction of said second transistor, (c) said second transistor having an output, (d) negative feedback means connected between said input and said output, (e) a first semiconductor diode connected to said input and producing an electrical signal at said input in response to optical radiation being absorbed therein to generate charge carriers which are collected at the junction thereof, (f) a second semiconductor diode for generating optical radiation direction on said first diode having a wave length such that at least a portion of said radiation is absorbed within said first diode to generate charge carriers which are collected at said junction, (g) a third transistor having an input interconnected with said output of said second transistor and being driven thereby, and (h) a fourth transistor interconnected with and being driven by said third transistor so that increases and decreases in the conduction of said third transistor causes corresponding increases and decreases in the conduction of said fourth transistor, (i) the conduction of said third and said fourth transistors being increased and decreased oppositely as the conductions of said first and said second transistors, (j) one of said first and said second transistors being substantially identical to one of said third and said fourth transistors, and the other of said first and said second transistors being substantially identical to the other of said third and said fourth transistors.

13. An optoelectronic system comprising:

(a) a first transistor having an input, (b) a second transistor interconnected with and being driven by said first transistor and having a first output, (c) a supply potential, (d) a first load impedance connected between said supply potential and said first output, (e) a first negative feedback means interconnected with said first output and said input, (f) a first semiconductor diode connected to said input and producing an electrical signal at said input in response to optical radiation being absorbed therein to generate charge carriers which are collected at the junction thereof, (g) a second semiconductor diode for generating optical radiation directed on said first diode having a wave length such that at least a portion of said radiation is absorbed within said first diode to generate charge carriers which are collected at said junction, (h) a third transistor interconnected with and being driven by said first output of said second transistor and having a second output, (i) a second load impedance connected between said supply potential and said output, and (j) a second negative feedback means interconnected with said second output and said first output.

14. An optoelectronic system according to claim 13 wherein said second negative feedback means is effective to prevent said third transistor from conducting in a saturated mode.

15. An optoelectronic system according to claim 13 wherein the voltage at said second output decreases as the voltage at said first output increases and said second negative feedback means prevents any substantial increase in the voltage at said first output when the voltage at said second output decreases below a preselected magnitude.

16. An optoelectronic system according to claim 13 wherein said first diode supplies a first current to said input of a first polarity whose magnitude is proportional to the intensity of said optical radiation, the voltage at said first output increases toward said supply potential as said first current increases, said first negative feedback means supplies a second current to input of a second polarity opposite to said first polarity whose magnitude is proportional to said first output voltage, the voltage at said second output decreases from said supply potential as said first output voltage increases, and said second negative feedback means being effective when said second output voltage decreases below a preselected magnitude to prevent any further substantial increase in said first output voltage and to produce an increasing voltage as applied to said first feedback means for increasing said second current as said first current increases.

17. An optoelectronic system according to claim 16 wherein said second negative feedback means comprises a first active device connected to said second output which becomes conductive when said second output voltage decreases below said preselected magnitude, and a second active device interconnected with said first output and said first feedback means which provides a voltage following action between said first and said second outputs and an amplification action between said second output and said first negative feedback means.

18. An optoelectronic system according to claim 17 wherein said first and said second active devices comprise fourth and fifth transistors, said fourth transistor is interconnected by means of its emitter and collector between the base of said fifth transistor and said second output, said fifth transistor is interconnected by means of its emitter and collector between said first negative feedback means and said first output, and said second negative feedback means includes first and second resistors interconnected, respectively, between the bases of said fourth and said fifth transistors and said first negative feedback means.

19. An optoelectronic system comprising:

(a) first transistor and second transistor with the emitter of said first transistor connected to the base of said second transistor, (b) a supply potential and a reference potential with the collector of said first transistor connected to said supply potential and the emitter of said second transistor connected to said reference potential, (c) a first load impedance interconnected with said supply potential and the collector of said second transistor comprising a first load resistor connected to said supply potential and a third transistor having its collector and emitter interconnected, respectively, with said first load resistor and said collector of said second transistor, (d) a first feedback impedance interconnected with said first load resistor and the base of said first transistor, (e) a first semiconductor diode interconnected between said base of said first transistor and said reference potential and being reverse biased through said first feedback impedance, (f) said first diode producing an electrical signal at said base of said first transistor in response to optical radiation being absorbed therein to generate charge carriers which are collected at the junction thereof, (g) a second semiconductor diode for generating optical radiation directed on said first diode having a wave length such that at least a portion of said radiation is absorbed within said first diode to generate charge carriers which are collected at said junction, (h) a fourth transistor having its base connected to the collector of said second transistor, and its emitter connected to said reference potential, (i) a second load resistor interconnected between said supply potential and the collector of said fourth transistor, (j) a fifth transistor having its emitter connected to said collector of said fourth transistor and its collector connected to the base of said third transistor, (k) a third resistor connected between the base of said fifth transistor and said first load resistor, and (l) a fourth resistor connected between said base and said collector of said third transistor.

20. An optoelectronic system according to claim 19 including a sixth transistor having its base to said collector of said fourth transistor and its collector connected to said supply potential, and a fifth resistor connected between the emitter of said sixth transistor and said reference potential.

21. An optoelectronic system according to claim 20 wherein all of said transistors are substantially identical.

22. An optoelectronic system according to claim 20 including a capacitor interconnected with and shunting a portion of each of said first load resistor and said first negative feedback means.

23. An optoelectronic system according to claim 22 wherein said entire system forms a semiconductor integrated network.

24. An optoelectronic system according to claim 22 wherein said first diode is characterized by the absence of any other rectifying junction that would substantially reduce the number of charge carriers that would otherwise be collected at said first mentioned junction in the absence of said any other rectifying junction and substantially reduce said signal.

25. An optoelectronic system according to claim 22 including means for electrostatically shielding said first diode to substantially reduce any distributed capacitance that would otherwise exist between said second diode and the region of said first diode connected to said base of said first transistor.

26. A negative feedback circuit for being connected between the output of a first amplifier having negative feedback to its input and the output of a succeeding amplifier, comprising:

(a) first means for providing a feedback path between the outputs of said first and said second amplifiers when the potential at the output of said second amplifier decreases below a preselected magnitude relative to the potential at the output of said first amplifier, and (b) second means responsive to the feedback of said first means for preventing a substantial increase in the potential at the output of said first amplifier and for providing a negative feedback potential to the input of said first amplifier substantially the same as the potential that would exist at the output of said first amplifier in the absence of said first and said second means.

27. A negative feedback circuit according to claim 26 wherein said first means comprises a diode means, and said second means comprises a transistor means.

28. A negative feedback circuit according to claim 26 wherein said first and said second means comprises first and second transistors, respectively, one of said collector and emitter of said first transistor being connected to the base of said second transistor, including a first resistor connected to the base of said first transistor, and a second resistor connected between the base of said second transistor and one of the emitter and collector thereof.

29. An optoelectronic system comprising:

(a) a differential transistor amplifier having a pair of inputs and a pair of corresponding outputs including negative feedback means connected between each of said pair of inputs and said corresponding outputs, (b) a first semiconductor junction device connected to one of said pair of inputs for producing an electrical signal at said one input in response to optical radiation being absorbed therein to generate charge carriers which are collected at said junction, and (c) a second device for generating optical radiation directed on said first device having a wave length such that at least a portion of said radiation is absorbed within said first device to generate charge carriers which are collected at said junction.

30. An optoelectronic system according to claim 29 including a third semiconductor junction device substantially identical to said first device connected to the other of said pair of inputs, and a fourth device substantially identical to said second device for generating optical radiation directed on said third device.

31. An optoelectronic system according to claim 29 wherein said first device is characterized by the absence of any other junction that would substantially reduce the number of charge carriers that would otherwise be collected at said first mentioned junction in the absence of said any other junction and substantially reduce said signal.

32. An optoelectronic system according to claim 29 wherein said second device comprises a semiconductor diode which generates said radiation in response to a forward current flow across the junction thereof.

33. An optoelectronic system comprising:

(a) a differential transistor amplifier having a pair of inputs and a pair of corresponding outputs including negative feedback means connected between each of said pair of inputs and said corresponding outputs, (b) a first semiconductor diode connected to one of said pair of inputs for producing an electrical signal at said one input in response to optical radiation being absorbed therein to generate charge carriers which are collected at the junction thereof, (c) a second semiconductor diode for generating optical radiation directed on said first diode in response to a forward current flow across the junction thereof, (d) said radiation generated by said second diode having a wave length such that at least a portion thereof is absorbed within said first diode to generate charge carriers which are collected at the junction of said first diode, (e) first and second transistors connected to said pair of outputs, respectively, for being driven thereby, (f) an impedance, (g) a reference potential, (h) said first and said second transistors being commonly connected to said reference potential through said impedance to limit the amount of current that said first and said second transistors can conduct from said pair of outputs, and (i) means for preventing said first and said second transistors from conducting in a saturated mode.

34. An optoelectronic system comprising:

(a) amplifier means having an input and output, (b) a load impedance interconnected with said output, (c) negative feedback means connected between said input and said output, (d) said negative feedback means comprising a first feedback impedance and a second feedback impedance interconnected with and shunting a portion of each of said load impedance and said first feedback impedance, (e) said second feedback impedance being characterized by a magnitude which varies inversely as a function of frequency, (f) a first semiconductor device connected to said input and containing a rectifying junction, said first device producing an electrical signal at said input in response to optical radiation being absorbed therein to generate charge carriers which are collected at said rectifying junction, and (g) a second device for generating optical radiation directed on said first device having a wave length such that at least a portion of said radiation is absorbed within said first device to generate charge carriers which are collected at said rectifying junction.

35. An optoelectronic system according to claim 34 wherein said second feedback impedance comprises a capacitance.

References Cited

UNITED STATES PATENTS

| | | | |
|---|---|---|---|
| 3,210,622 | 10/1965 | Gradus | 317—235 |
| 3,321,631 | 5/1967 | Biard et al. | 250—209 |
| 3,064,132 | 11/1962 | Strull | 250—211 |
| 3,210,622 | 10/1965 | Gradus | 317—235 |

OTHER REFERENCES

"Light Actuated Semiconductor Switching Devices," by Yu, IBM Tech. Discl. Bulletin, vol. 6, No. 4, September 1963, p. 63.

WALTER STOLWEIN, Primary Examiner

M. ABRAMSON, Assistant Examiner

U.S. Cl. X.R.

250—211; 317—235